Nov. 3, 1931.  D. H. SPICER  1,830,249
AUTOMATIC INFLATING DEVICE
Filed March 15, 1930
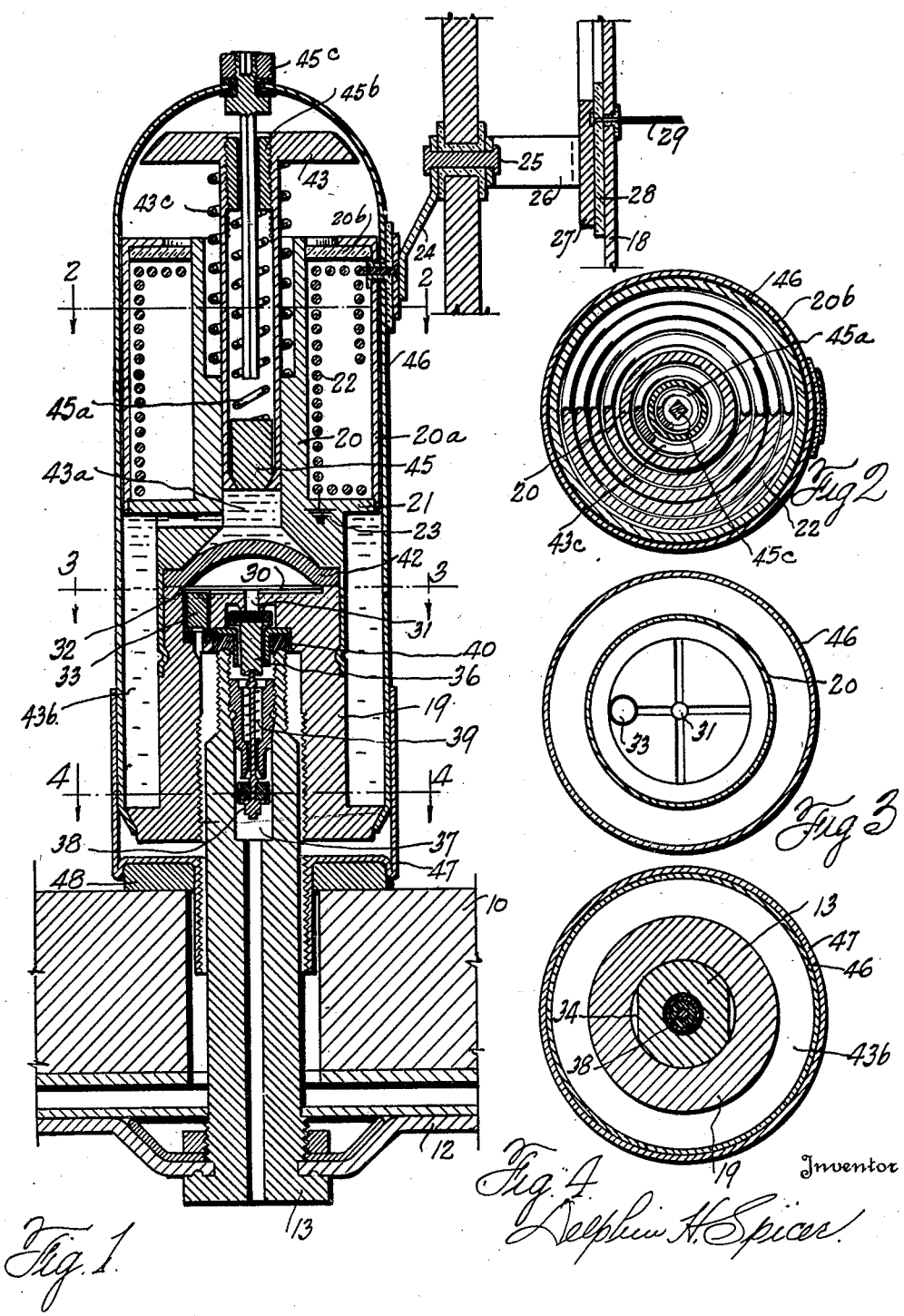

Patented Nov. 3, 1931

1,830,249

UNITED STATES PATENT OFFICE

DELPHIN H. SPICER, OF LAKEWOOD, OHIO

AUTOMATIC INFLATING DEVICE

Application filed March 15, 1930. Serial No. 436,261.

This invention relates to a pump of the type adapted to be normally attached to the valve stem of an automobile wheel for the purpose of automatically maintaining proper air pressure in the tires at all times and to the combination of such a pump with such a wheel. One object is to provide such a pump which will be electrically operated. A further object is to provide such an improved device of a compact and efficient design and embodying numerous improved details of construction and novel arrangement of parts. Other and more specific objects will become apparent as the description proceeds.

Fig. 1 is a schematic sectional view showing my inflating device in position; Fig. 2 is a section on line 2—2 of Fig. 1; Fig. 3 is a section on line 3—3 of Fig. 1; and Fig. 4 is a section on line 4—4 of Fig. 1.

In the drawings I have illustrated the rim 10 of an automobile wheel containing an inner tube 12 which is provided with a valve stem 13 extending through said rim and upon which my improved pump is to be mounted. Threaded on the outside of the valve stem 13 is a shell 19 made of non-magnetic material, such as brass, and upon which is fixedly secured a magnetic member 20 of a generally cylindrical shape and having a flange 21. Around the member 20 is wound an electric coil 22 which is grounded at one end as shown at 23 and on the other end is insulated through the casing and connected by means of a conducting clip 24 and insulated rivet 25 to a brush 26 which in turn bears upon a commutator 27 carried by the shell 18 of the usual brake drum, insulated therefrom by a sheet 28 and connected through a conductor 29 to a suitable source of electric current carried by the automobile. A magnetic sheath 20$^a$ surrounds the coil and an insulating plate 20$^b$ covers the top thereof.

The upper portion of the non-magnetic member 19 forms a portion of an expansible chamber pump, having an upper surface 30 and openings 31 and 32 therein for the reception of valves controlling the entrance and discharge of air from the pump chamber. The valve member 33 permits air to enter the pump chamber from the atmosphere along the flattened side 34 in the valve stem 13 and through opening 32 past the valve member 33 into the pump chamber and prevents movement of air through such openings in the opposite direction. The valve member 36, which holds the valve portion 38 normally open against the action of the spring 39, operates to close the opening 31 except when considerable pressure is exerted by the movable member of the pump, in which case it moves downwardly and permits air to pass through the opening 31 and into the valve stem opening 37. A seal is maintained between the valve stem and the shell 19 by means of a packing gland 40 against which such valve stem bears. The remaining portion of the pump includes the flexible member 42 and a cap 43 which actuates the same through the medium of a suitable liquid in the chambers 43$^a$ and 43$^b$ and is resiliently held spaced from the magnetic member 20 by a spring 43$^c$ of non-magnetic material. The cap 43 is of magnetic material, to be attracted by the magnetism in the magnetic member 20, and carries in its upper portion an adjusting valve 45, by means of which is determined the pressure of inflation at which the tire will be maintained. Extending over the entire unit is a shell 46 which will preferably be made of non-magnetic metal, but may be made of other suitable material. At the lower end, telescoping the shell 46 and threaded on the stem 13 is a sleeve 47 which bears on a fibrous washer 48 which in turn bears against the wheel rim 10.

In operation, the conductor 29 will be connected to a suitable source of electric current, such as a battery, and to the commutator 27. Such commutator will have at the outer edge interruptions whereby the brush 26 passing thereover will alternately make and break the electric circuit. From the brush the current will flow through the rivet 25 and conductor 24 to the coil 22, alternately energizing and deenergizing the same as the wheel turns. The magnetic member 20 will thus be alternately energized and deenergized, which will result in its alternately attracting and releasing the cap 43, which by reason of the spring 43$^c$, will be given a reciprocating movement. This movement will result in a pumping action which will cause inflation of the tire, the extent of such inflation being regulated by the tension on the spring 45$^a$ which can be varied by adjusting the nut 45$^b$, which may be accomplished by rotating the member 45$^c$.

While I have illustrated and described certain embodiments of my invention, it will be obvious that the same can be carried out in numerous variant forms without departing from the essence of such invention, and I wish it understood that I am limited only in accordance with the appended claims.

Having thus described my invention, what I claim is:

1. In an inflating device including a unit adapted to be normally attached to the valve stem of an automobile wheel, a pump mechanism forming a part of said unit, electrical means also forming a part of said unit for actuating said pump, and means operated by rotation of the wheel for alternately connecting and disconnecting said electrical means with a source of current.

2. In an inflating device including a unit adapted to be normally attached to the valve stem of an automobile wheel, the combination of said unit with said wheel, a pump mechanism forming a part of said unit, electrical means also forming a part of said unit for actuating said pump, and means connected to said unit and operated by rotation of said wheel for energizing said electrical means in such a way as to operate said pump.

3. In an inflating device including a unit adapted to be normally attached to the valve stem of an automobile wheel, a pump mechanism forming a part of said unit, electrical means for actuating said pump, and means operated by rotation of the wheel alternately energizing and deenergizing said electrical means, said last means including a commutator and a brush cooperating therewith, one of which is carried by said wheel.

In testimony whereof, I hereunto affix my signature.

DELPHIN H. SPICER.